(12) United States Patent
Krishnaswamy

(10) Patent No.: US 12,219,249 B1
(45) Date of Patent: Feb. 4, 2025

(54) WIRELESS AUDIOVISUAL CONTROLLER

(71) Applicant: PauseMe Co., Vero Beach, FL (US)

(72) Inventor: Dolly Krishnaswamy, Vero Beach, FL (US)

( * ) Notice: Subject to any disclaimer, the term of this patent is extended or adjusted under 35 U.S.C. 154(b) by 220 days.

(21) Appl. No.: 18/088,118

(22) Filed: Dec. 23, 2022

(51) Int. Cl.
*H04N 23/66* (2023.01)
*G06F 3/023* (2006.01)
*H04R 1/08* (2006.01)

(52) U.S. Cl.
CPC ............ *H04N 23/66* (2023.01); *G06F 3/023* (2013.01); *H04R 1/08* (2013.01)

(58) Field of Classification Search
CPC ........ H04N 23/66; H04N 23/50; H04N 23/51; H04N 23/60; G06F 3/023; H04R 1/08
See application file for complete search history.

(56) References Cited

U.S. PATENT DOCUMENTS

| | | | |
|---|---|---|---|
| 4,658,425 A | | 4/1987 | Julstrom |
| D513,234 S | * | 12/2005 | Martin .......................... D13/168 |
| D550,654 S | | 9/2007 | Miyawaki |
| D596,163 S | * | 7/2009 | Madonna ...................... D14/218 |
| 8,577,501 B2 | * | 11/2013 | Cross ...................... H04L 67/10 |
| | | | 901/17 |
| 8,605,872 B2 | | 12/2013 | Mock |
| 8,619,112 B2 | | 12/2013 | Kristiansen et al. |
| 8,885,057 B2 | | 11/2014 | Mock |
| 9,807,446 B2 | | 10/2017 | Sirpal et al. |
| D802,650 S | | 11/2017 | Hoshi |
| D805,482 S | | 12/2017 | McRoberts et al. |
| D865,718 S | | 11/2019 | Russo et al. |
| D873,245 S | | 1/2020 | Russo et al. |
| D881,162 S | | 4/2020 | Zhu |
| 2002/0054206 A1 | * | 5/2002 | Allen ...................... H04N 5/602 |
| | | | 348/E5.103 |
| 2005/0202377 A1 | * | 9/2005 | Kim ........................ G09B 5/06 |
| | | | 434/156 |
| 2013/0120919 A1 | | 5/2013 | Erickson |

(Continued)

OTHER PUBLICATIONS

Muteme, The mistake-free-meeting Button, Website, Dec. 23, 2022, One Page, muteme.com.

(Continued)

*Primary Examiner* — Nhan T Tran
(74) *Attorney, Agent, or Firm* — Goldstein Law Offices, P.C.

(57) ABSTRACT

An audiovisual controller adapted to transmit control signals to a computing device for controlling microphone and video functions of an audiovisual application executed on the computing device. The audiovisual controller has a housing with a first portion having a first switch and a second portion having a second switch. The first switch and the second switch are each associated with either the microphone or video function of the audiovisual application. The first portion and the first switch are enlarged compared to the second portion and the second switch, and provide visual and tactile differentiation to prevent a user from misidentifying or unintentionally activating the incorrect switch. Each switch further has an illumination element which emits light in accordance with a plurality of illumination states, and activation of the switch causes the illumination element to alternate between the illumination states.

11 Claims, 7 Drawing Sheets

(56) References Cited

U.S. PATENT DOCUMENTS

| | | |
|---|---|---|
| 2014/0210938 A1 | 7/2014 | Mock |
| 2016/0070534 A1 | 3/2016 | Kripalani et al. |
| 2017/0244932 A1* | 8/2017 | Pistilli .................. G16H 40/67 |

OTHER PUBLICATIONS

Zoom Mute & Video Shortcut Buttons, Rival Competitor.
Linkidea, Zoom Meeting Mute Button, Amazon Web Site, Dec. 23, 2022, Eleven Pages, amazon.com.
Elliot Bradford, Zoom Mute Button—Mute Cube, Etsy Web Site, Dec. 23, 2022, Nine Pages, etsy.com.
Mute and Camera Button V2, Rival Competitor.
Computer Space Bar—Push to Talk, Rival Competitor.
ALT + A Keyboard Shortcut, Substitute Product.
ALT + V Keyboard Shortcuts, Substitute Product.

* cited by examiner

WIRELESS AUDIOVISUAL CONTROLLER

TECHNICAL FIELD

The present disclosure relates generally to a wireless input device for interacting with a computing device. More particularly, the present disclosure relates to a wireless controller for toggling audiovisual functions of an audiovisual application executed on a computing device.

BACKGROUND

Videoconferencing applications allow users to communicate through video and voice via the internet. These applications employ video cameras and microphones to capture video and audio of their users for transmission to other remote users of the application. Such applications provide users with the ability to disable or enable their cameras and microphones through controls provided in a graphical user interface or through keyboard commands. However, these controls often provide very little feedback, leaving users unaware of whether their video or microphone functions have been enabled or disabled. A user who mistakenly believes that the camera or microphone functions have been disabled may unknowingly transmit sound or video to unintended recipients, resulting in inconvenience or embarrassment. Conversely, a user who is unaware that the microphone has been disabled may attempt to speak without realizing that the other users are unable to hear them speaking.

There are devices in the prior art which attempt to address limitations of user interfaces by providing specialized physical input devices having switches for controlling microphone and camera functions. However, such devices have several disadvantages. Firstly, existing devices do not provide enough differentiation between the switches, and may result in user accidentally pressing the incorrect switch. Secondly, existing devices require the installation of accompanying software or device drivers in order to access the camera or microphone functions of the computer. Many users are prevented from installing software or initiating system changes by security policies in place on their computers. Such users would be unable to configure existing devices without the aid of a system administrator. Thirdly, existing devices utilize wired interfaces to communicate with computers, and thus forgo the convenience and advantages of cable-free operation.

Therefore, an urgent need exists for a wireless control device which can quickly establish an initial connection with a computer without the need for software installation or configuration, and which further provides highly noticeable visual and tactile differentiation between switches to prevent misidentification and unintentional activation of switches.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a wireless controller for enabling or disabling video and microphone functions of an audiovisual application. Accordingly, the present disclosure provides a wireless audiovisual controller configured to communicate wirelessly with a computing device via a wireless communication protocol. The computing device executes an audiovisual application which receives and transmits video captured by a video camera and audio captured by a microphone. The audiovisual controller has two switches, and each switch is associated with either a first control signal for toggling the microphone function or a second control signal for toggling the video function. Activating one of the switches causes the audiovisual controller to transmit the corresponding control signal to the computing device, and toggles either the microphone function or the video function between a disabled state or an enabled state.

It is another aspect of an example embodiment in the present disclosure to provide a wireless controller which functions without a need to install additional software or drivers. Accordingly, the first control signal and the second control signal are formatted to be interpreted by the computing device as embodying a keyboard keypress combination supported within the wireless communication protocol. Each keypress combination corresponds to a keyboard shortcut which the audiovisual application is configured to recognize as a command for toggling the microphone function or the video function.

It is yet another aspect of an example embodiment in the present disclosure to provide a wireless controller which differentiates the first and second switches using visual and tactile cues. Accordingly, the audiovisual controller has a housing with a first portion and a second portion. The first switch is disposed on the first portion, while the second switch is disposed on the second portion. The first switch and the first portion are significantly enlarged relative to the second switch and the second portion. The audiovisual controller thus provides tactile and visual differentiation which prevents the user from misidentifying and unintentionally activating either the first switch or the second switch.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
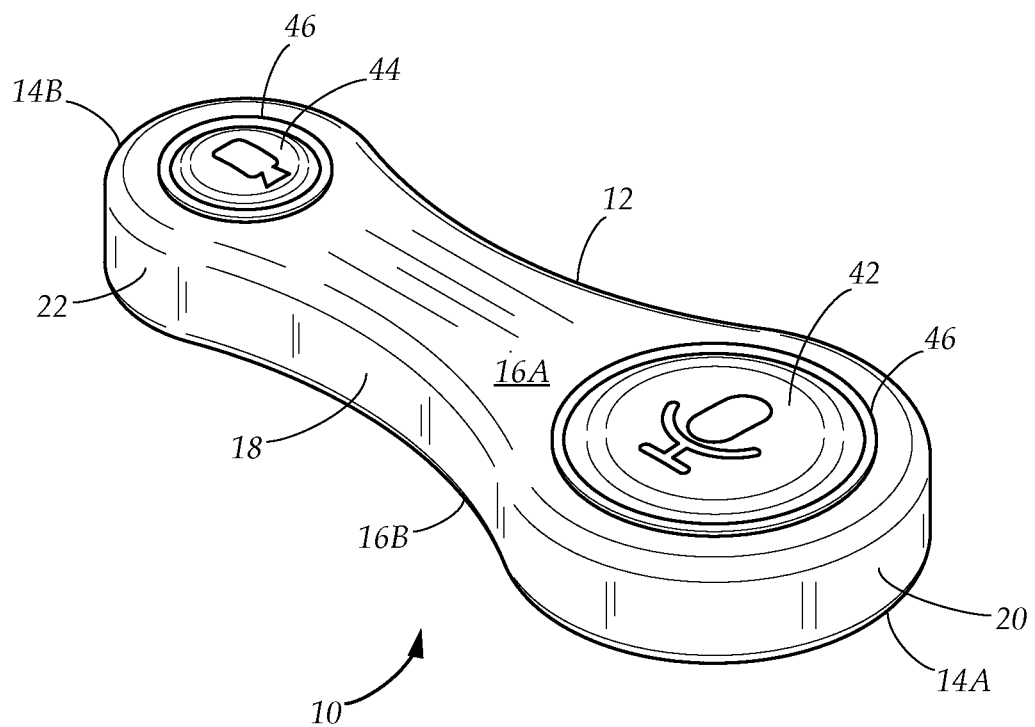
FIG. 1 is a diagrammatical perspective view depicting an audiovisual controller with a first portion and a second portion joined by a central connecting portion, with a first switch located at the first portion and a second switch located at the second portion, in accordance with an embodiment in the present disclosure.
Figure 2:
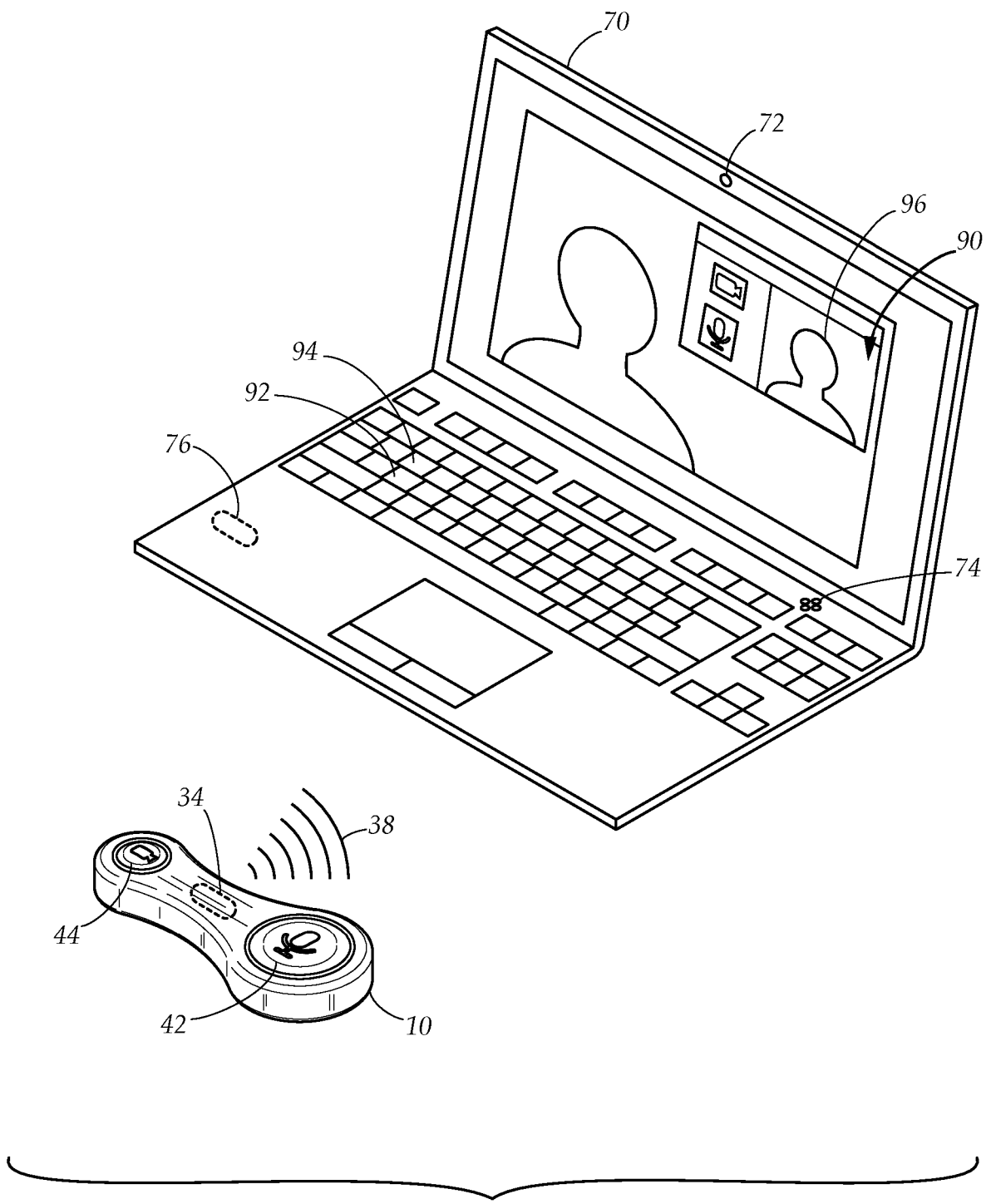
FIG. 2 is a diagrammatical perspective view depicting the audiovisual controller communicating with a computing device via wireless transmissions, in accordance with an embodiment in the present disclosure.
Figure 3:
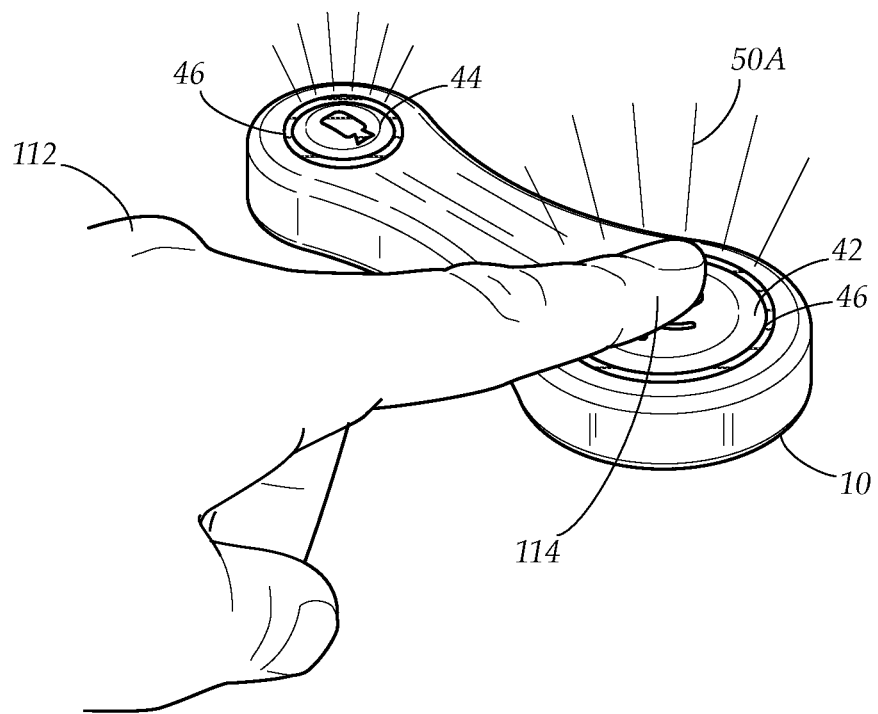
FIG. 3 is a diagrammatical perspective view of the audiovisual controller showing a user activating one of the switches by pressing the switch with a finger, in accordance with an embodiment in the present disclosure.

FIG. 1, FIG. 2, and FIG. 3 illustrate an audiovisual controller 10 adapted to communicate wirelessly with a computing device 70 to alternatively disable or enable microphone or video functions of an audiovisual application 90 executed by the computing device 70. The audiovisual controller 10 comprises a housing 12 and a plurality of user-activated switches including a first switch 42 and a second switch 44. The housing 12 is shaped to allow a user to identify and differentiate between the first switch 42 and the second switch 44 by touch as well as sight, thus allowing the user to quickly locate and accurately activate either the first switch 42 or the second switch 44. Activation of one of the switches causing the audiovisual controller 10 to broadcast wireless transmissions 38 to a computing device 70 via a wireless communication protocol such as Bluetooth, or another suitable communication protocol employing short ranged radio frequencies.

Figure 6:
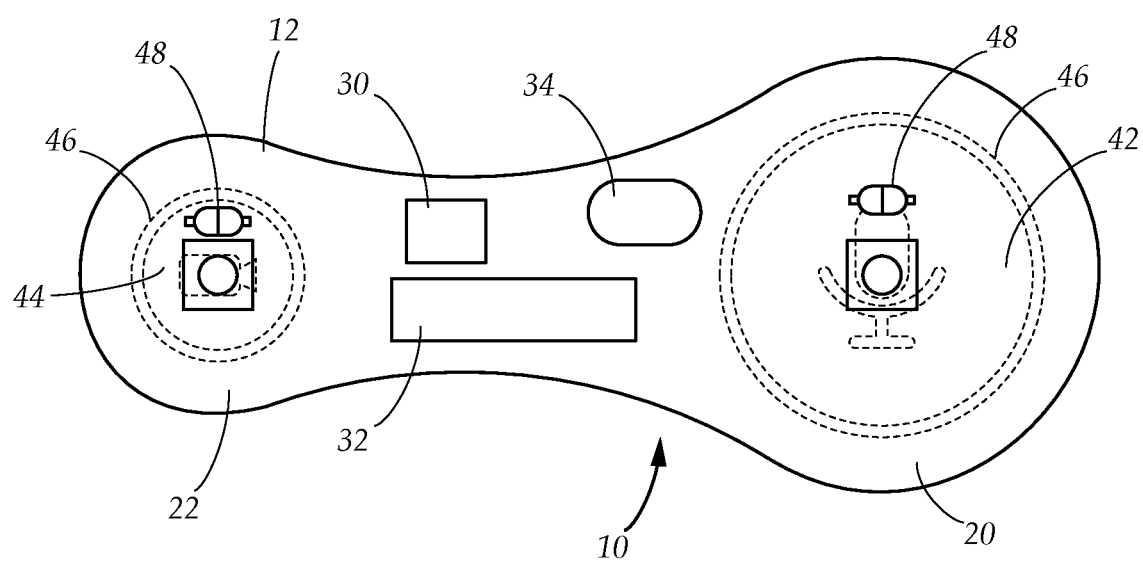
FIG. 6 is a diagrammatical depiction of electronic components contained within the housing of the audiovisual controller, including the control module and wireless communication module, in accordance with an embodiment in the present disclosure.
Figure 7:
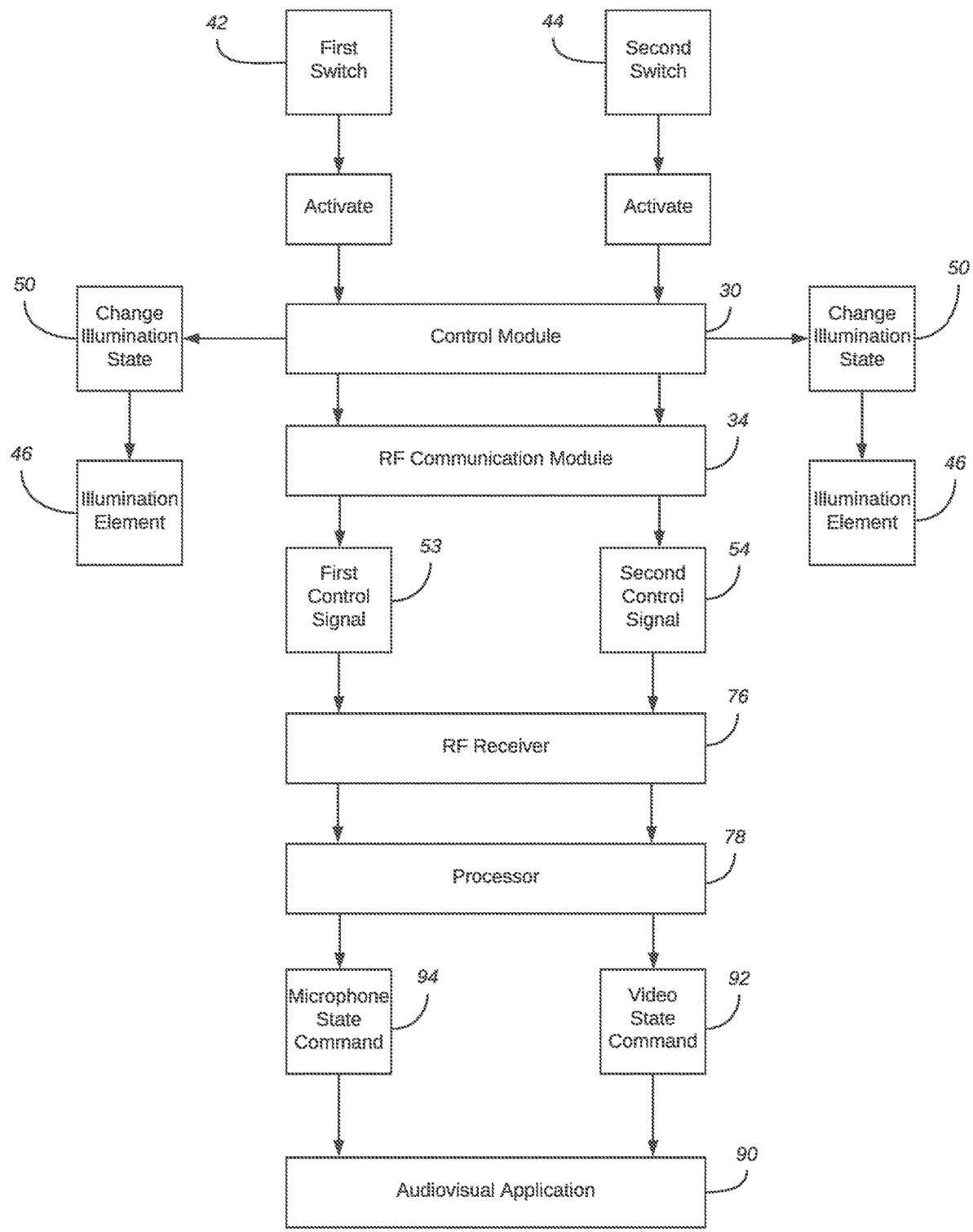
FIG. 7 is a block diagram depicting the transmission of control signals from the audiovisual controller to the computing device, and the interpretation of the control signals by the computing device as commands to enable or disable video or microphone functions of the audiovisual application, in accordance with an embodiment in the present disclosure.

Turning to FIG. 6 and FIG. 7 while also referring to FIGS. 1-3, the audiovisual controller 10 further comprises a control module 30, a wireless communication module 34, and a battery 32 which are each contained within the housing 12. The wireless communication module 34 is adapted to communicate via the wireless communication protocol, and is configured with an RF transmitter or transceiver. The control module 30 is operably linked to each of the switches and the communication module 34, and is adapted to cause the wireless communication module 34 to generate a control signal when one of the switches is activated. In one embodiment, the control module 34 may be implemented using a microcontroller. The battery 32 provides electrical power to the various components of the audiovisual controller 10, and may be rechargeable. Alternatively, the battery 32 may be replaceable, and may correspond to an alkaline battery or other appropriate battery type.

In one embodiment, the first switch 42 and the second switch 44 each correspond to a mechanical switch, such as a push button switch, tactile switch, or other appropriate switch mechanism, which activates when pressed by the user 100. In an alternative embodiment, the first switch 42 and the second switch 44 may be implemented as a capacitive switch which detects contact between the hand 112 and the switch and results in activation of the switch.

In a preferred embodiment, the first switch 42 and the second switch 44 each have an illumination element 46 which produces light in response to the activation of the switch. In one embodiment, a multicolor LED 48 is embedded within each of the first switch 42 and the second switch 44, and the LED 48 is adapted to emit a light in a plurality of colors. Alternatively, instead of a single multicolor LED 48, a plurality of LEDs each configured to emit light in a single color may be incorporated into the illumination element 46.

Figure 4:
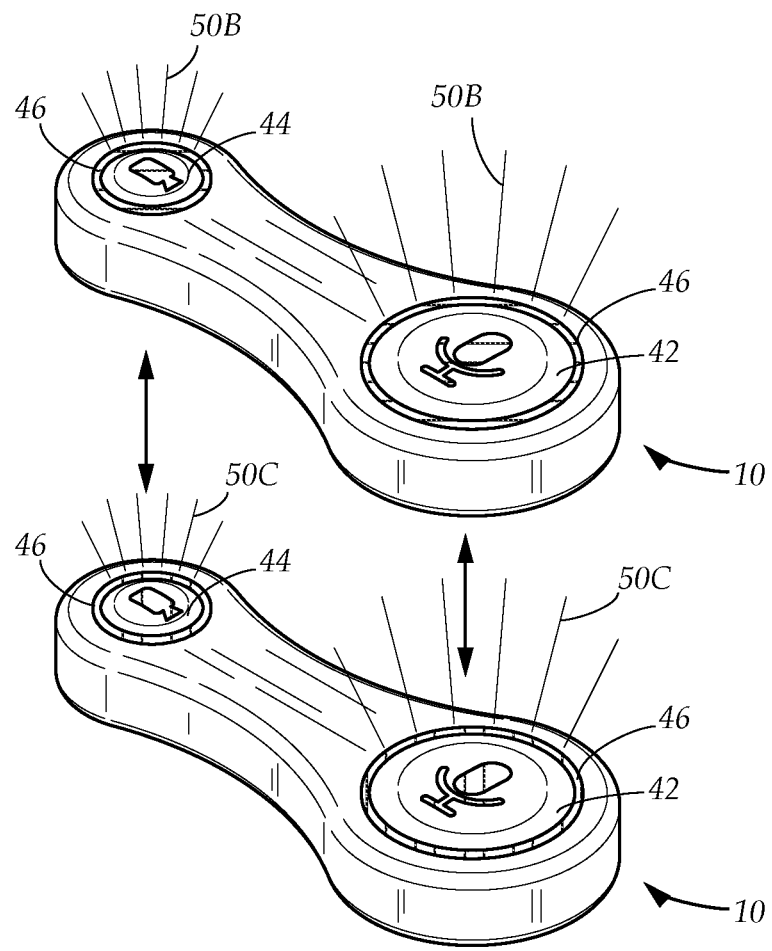
FIG. 4 is a diagrammatical perspective view of the audiovisual controller, showing an illumination element incorporated within each of the switches which emits light upon activation of the switch, further showing the illumination element alternating between two illumination states, in accordance with an embodiment in the present disclosure.

Turning to FIG. 4 while also referring to FIG. 6 and FIG. 7, each illumination element 46 is configured to emit light in accordance with a plurality of illumination states 50 comprising a first illumination state 50B and a second illumination state 50C, in which each illumination state 50 represents a single color. The illumination element 46 emits a first color in the first illumination state 50B and a second color in the second illumination state 50C. In one example, the first color is green, while the second color is red. Activation of the switch causes the illumination element 46 to alternate between the first illumination state 50B and the second illumination state 50C. In addition, the illumination element 46 may be configured to emit the light in flashes or timed pulses. Note that the examples of red and green light are non-limiting, and the first color and the second color may correspond to any visible color.

Figure 5:
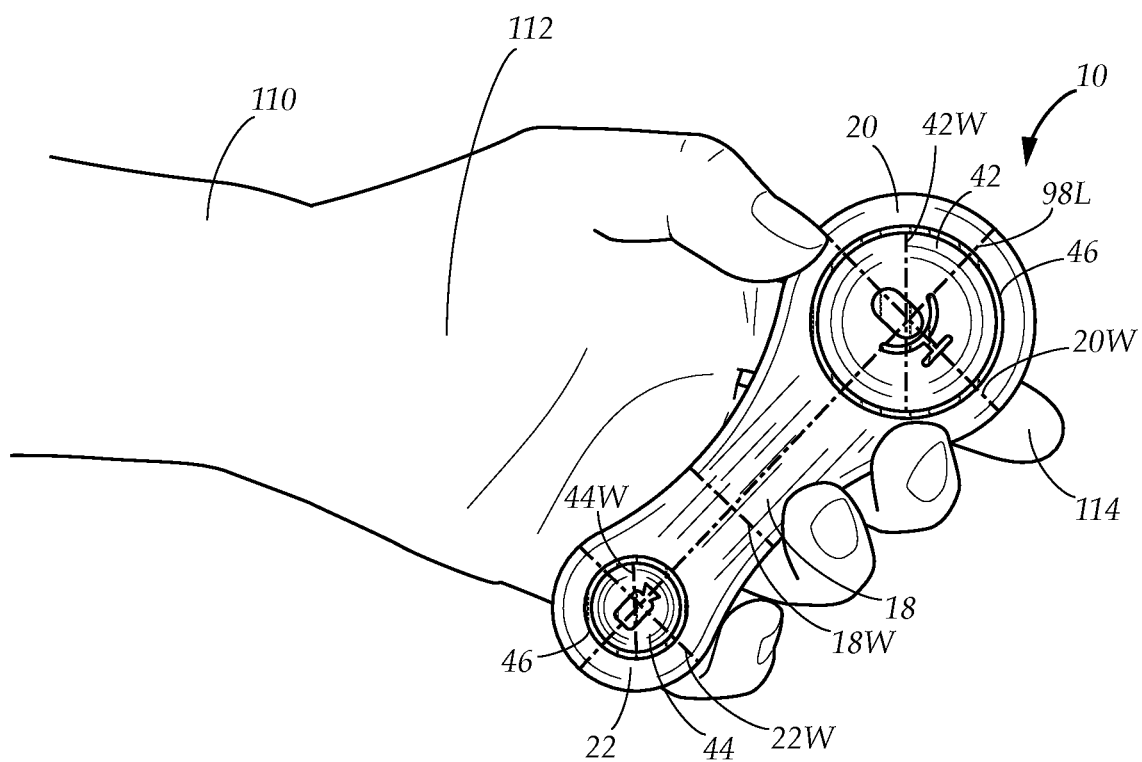
FIG. 5 is a diagrammatical perspective view of the user holding the audiovisual controller in the user's hand, in accordance with an embodiment in the present disclosure.

Turning to FIG. 5 while also referring to FIGS. 1-3, the housing 12 of the audiovisual controller 10 has a physical configuration which provides visual and tactile sensory cues which allow the user to quickly and accurately distinguish the first switch 42 from the second switch 44. In a preferred embodiment, the housing 12 of the audiovisual controller 10 has a first end 14A, a distally oriented second end 14B, a first portion 20 positioned at the first end 14A, and a second portion 22 positioned at the second end 14B. In one embodiment, the housing 12 further has an upper surface 16A disposed between the first end 14A and the second end 14B. The first switch 42 is positioned upon the upper surface 16A at the first portion 20, while the second switch 44 is positioned upon the upper surface 16A at the second portion 22. The housing 12 may have a substantially flat lower surface 16B disposed opposite the upper surface 16A. The audiovisual controller 10 may be positioned with the lower surface 16B resting upon a horizontal surface, such as a tabletop or desktop, allowing the first switch 42 and the second switch 44 positioned upon the upper surface 16A to remain accessible to the user 110.

Referring to FIG. 5 while also referring to FIGS. 1-3, the housing 12 has a length 98L extending longitudinally between the first end 14A and the second end 14B. The first portion 20 and the second portion 22 have a first portion width 20W and a second portion width 22W respectively, measured laterally across the length 98L of the housing 12. The first switch 42 has a first switch width 42W, while the second switch 44 has a second switch width 44W. In one embodiment, the first switch 42 and the second switch 44 are circular in shape, and the first switch width 42W and the second switch width 44W correspond to the diameter of each switch. The first portion 20 and the second portion 22 may also be rounded in shape at the first end 14A and the second end 14B of the housing 12.

In a preferred embodiment, the housing 12 is significantly enlarged at the first portion 20 relative to the second portion 22, thus allowing the user to distinguish the first portion 20 from the second portion 22 by touch, thus minimizing the risk of the user misidentifying and incorrectly activating one of the switches. For example, if the user wishes to activate the first switch 42, the user may identify the first portion 20 by touch based on the comparative size of the first portion 20 relative to the second portion 22.

To further distinguish the first switch 42 from the second switch 44, the first switch 42 may also be enlarged relative to the second switch 44. For example, the first switch 42 may have a first switch width 42W which is approximately two times larger than second switch width 44W. The first portion width 20W will be correspondingly larger than the second portion width 22W to accommodate the increased size of the first switch 42 relative to the second switch 44. For example, the first portion width 20W may be at least one and a half times larger than the second portion width 22W. Note that in certain embodiments, the first switch 42 and the second switch 44 may additionally incorporate visible symbols or text labels which indicate whether the switch is associated with the microphone function or the video function.

In certain embodiments, the housing 12 provides increased separation between the first switch 42 and the second switch 44 by increasing the distance between the first portion 20 and the second portion 22. In one embodiment, the housing 12 further has a connecting portion 18 disposed centrally between the first portion 20 and the second portion 22.

In one embodiment, the connecting portion 18 has a connecting portion width 18W which is less than the second portion width 22W. As such, the width of the housing 12 of the audiovisual controller 10 decreases from the enlarged first portion 20 to a minimum at the connecting portion 18. The width of the housing 12 then gradually increases towards the second portion 22. This configuration imparts ergonomic advantages when the audiovisual controller 10 is held within the hand 112 of the user, and may be employed as a hand grip. For example, the audiovisual controller 10 may be held with the first portion 20 positioned adjacent to the thumb and forefinger and the second portion 22 positioned adjacent to the pinky, while the remaining fingers of the hand 112 rest along the connecting portion 18 between the first portion 20 and the second portion 22.

Turning to FIG. 7 while continuing to refer to FIGS. 1-2, the computing device 70 has a screen for displaying graphics, a processor 78 for executing an operating system and computer programs, an input controller which allows the computing device 70 to receive user commands, and an RF receiver 76 adapted to receive wireless transmissions 38 via the wireless communication protocol. The computing device 70 further has a camera 72 for capturing video, and a microphone 74 for capturing audio. The camera 72 and/or the microphone 74 may be integrated within the computing device 70, or be configured as separate devices operably connected with the computing device 70. For example, the computing device 70 may be a laptop computer, tablet, or mobile phone in which the camera 72 and the microphone 74 are integrated, or a desktop computer configured to operate with a separate camera 72 or microphone 74. The computing device 70 is adapted to execute an audiovisual application 90 which receives the video and audio captured by the camera 72 and the microphone 74 respectively. In one example, the audiovisual application 90 is configured to transmit the captured audio and/or video to other computing devices via a data communication network such as the Internet, to facilitate communication between users.

The audiovisual application 90 allows the user to activate or deactivate the capture or transmission of audio or video by entering user commands through the input device of the computing device 70. In one embodiment, a video state command 92 may be inputted to activate or deactivate the capture of video by the camera 72 or the transmission thereof. Likewise, a microphone state command 94 may be inputted to activate or deactivate the capture of audio by the microphone 74, or transmission of the audio by the audiovisual application 90. In a preferred embodiment, the video state command 92 and the microphone state command 94 each correspond to a keystroke or combination of keystrokes entered through a keyboard or equivalent input device. In one non-limiting example, the audiovisual application 90 may be configured to recognize the keystroke combination of "Alt+A" as the microphone state command 94, and the keystroke combination of "Alt+V" as the video state command 92.

Referring to FIG. 6 and FIG. 7 while also referring to FIGS. 1-3, the audiovisual controller 10 allows the user to activate or deactivate the video and audio features of the audiovisual application 90 by replicating the keystrokes which correspond to the video state command 92 and the microphone state command 94, and by transmitting them to the computing device 70 via the wireless communication protocol. Conventional keyboard keystrokes are encoded within a control signal which the computing device 70 is configured to recognize as a keypress event. Each key on a keyboard is represented by a unique scan code, which allows the computing device 70 to recognize the control signal as an input associated with a keyboard keypress. In a preferred embodiment, the audiovisual controller 10 is adapted to generate and transmit control signals which are recognized by the computing device 70 as keyboard keystrokes in accordance with the wireless communication protocol. For example, the Bluetooth protocol utilizes scan codes contained within the USB HID (Human Interface Device) Specification. As such, the control module 30 of the audiovisual controller 10 may store the USB HID keyboard scan codes which embody the video state command 92 and the microphone state command 94 associated with the audiovisual application 90, and cause the communication module 34 to transmit the appropriate scan codes within the control signals when the either first switch 42 or the second switch 44 is activated. Note that a person of ordinary skill in the art in the field of the invention will appreciate that variations of the audiovisual controller 10 may be configured for use with a range of computing devices 70 and audiovisual applications 90 by taking into account the specific keyboard protocols applicable to the computing device 70 and the particular keypress combinations associated with the audiovisual application 90.

In one embodiment, activation of the first switch 42 causes the communication module 34 to transmit a first control signal 53 containing the microphone state command 94, while activation of the second switch 44 causes the communication module 34 to transmit a second control signal 54 containing the video state command 92. Each control signal is transmitted using the wireless communication protocol and is received by the RF receiver 76 of the computing device 70. The corresponding keystroke combination is interpreted by the processor 78, and the microphone state command 94 or video state command 92 is passed to the audiovisual application 90.

In a preferred embodiment, the audiovisual controller 10 is adapted to communicate with the computing device 70 audiovisual application 90 without the requiring the user to set up or modify either the audiovisual controller 10 or the computing device 70. The first switch 42 and the second switch 44 are each associated with only one set of scan codes corresponding to either the video state command 92 or the microphone state command 94 recognized by the audiovisual application 90. As such, the first control signal 53 and the second control signal 54 are formatted according to standard specifications as defined in the wireless communication protocol, and are interpretable by the computing device 70 and the audiovisual application 90 without the need to install device drivers or modify settings.

Referring to FIG. 3 while also referring to FIG. 2 and FIGS. 6-7, in one embodiment, the audiovisual controller 10 may be powered on or powered off by pressing and holding either the first switch 42 or the second switch 44. In one embodiment, the illumination element 46 may then operate in a power-on illumination state 50A which indicates that the audiovisual controller 10 is powered on. In certain embodiments, the power-on illumination state 50A may also indicate whether the communication module 34 has successfully established a connection with the computing device 70 via the wireless communication protocol. For example, the illumination element 46 may emit pulsed or flashing light until the connection has been established, whereupon the illumination element 46 will begin operating in the first illumination state 50B. In certain embodiments, the audiovisual controller 10 may comprise a separate power switch which is used to power-on on power-off the audiovisual controller 10.

Referring to FIGS. 2-4 while also referring to FIG. 6 and FIG. 7, in a preferred embodiment, the illumination states 50 of the first switch 42 and the second switch 44 operate independently of the audiovisual application 90. Activation of the switch causes the illumination element 46 to alternate between the first illumination state 50B and the second illumination state 50C. In one example where the first switch 42 is configured to transmit the microphone state command 94 within the first control signal 53, the colors of light emitted during the first illumination state 50B and the second illumination state 50C are not indicative of whether the microphone function of the audiovisual application 90 is currently active or disabled. Instead, the transition between illumination states 50 may be used to indicate to the user that the activation of the switch has been registered by the audiovisual controller and that the first or second control signal 53, 54 has been transmitted.

In an illustrative example, the audiovisual controller 10 may be configured such that the illumination element 46 of the first switch 42 operates in the first illumination state 50B once the controller 10 has been powered on and a connection with the computing device 70 has been established. On the other hand, the audiovisual application 90 may be set to begin operation with the microphone function disabled. The user presses and activates the first switch 42, causing the audiovisual controller to transmit the first control signal 53. The control module 30 also causes the illumination element 46 to alternate from the first illumination state 50B to the second illumination state 50C. The computing device 70 receives and interprets the first control signal 53, and the microphone state command 94 is passed to the audiovisual application 90, causing the microphone function to become enabled. The user then presses the first switch 42 for a second time, causing the first control signal 53 to be transmitted again, and further causing the illumination element 46 to alternate from the second illumination state 50C to the first illumination state 50B. The transmission of the first control signal 53 causes the audiovisual application 90 to disable the microphone function.

Continuing the present illustrative example, the audiovisual application 90 may begin operation with the video function enabled. The second switch 44 is associated with the video function, and the communication module 34 is configured to transmit a second control signal 54 containing the scan codes which initiate the video state command 92. Pressing the second switch 44 causes the second control signal 54 to be transmitted, and further causes the illumination state 50 to alternate from the first illumination state 50B to the second illumination state 50C. The computing device 70 receives and interprets the second control signal 54, and passes the video state command 92 to the audiovisual application 90, causing the video function to become disabled. Upon the user 100 pressing and activating the second switch 44 again, the illumination state 50 of the second switch 44 will alternate from the second illumination state 50C to the first illumination state 50B, and the second control signal 54 will be transmitted, causing the video function of the audiovisual application 90 to become enabled.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a wireless audiovisual controller. The disclosure is illustrated by example in the drawing figures, and throughout the written description. It should be understood that numerous variations are possible, while adhering to the inventive concept. Such variations are contemplated as being a part of the present disclosure.

What is claimed is:

1. An audiovisual controller for use with an audiovisual application executed on a computing device, the computing device has an RF receiver and is operably linked to a video camera and a microphone, the audiovisual application has a video function utilizing video captured by the video camera, and a microphone function utilizing audio captured by the microphone, the audiovisual application is further configured to recognize a first keypress combination and a second keypress combination, the audiovisual controller comprising:

a housing having a first end, a distally oriented second end, a first portion at the first end, and a second portion at the second end;

a plurality of switches comprising a first switch located within the first portion of the housing and a second switch located within the second portion of the housing; and a communication module operably linked to the switches, the communication module is adapted to wirelessly transmit a first control signal and a second control signal to the computing device via a wireless communication protocol, the first control signal contains the first keypress combination which activates or deactivates the microphone function of the audiovisual application, and the second control signal contains the second keypress combination which activates or deactivates the video function of the audiovisual application, the first control signal and the second control signal are each assigned to either the first switch or the second switch, allowing the first control signal or the second control signal to be transmitted upon activation of the corresponding switch, wherein: the first portion of the housing and the first switch are enlarged relative to the second portion of the housing and the second switch to provide tactile differentiation between the first switch and the second switch.

2. The audiovisual controller as described in claim 1, wherein: the first switch has a first switch width and the second switch has a second switch width, the first switch width is at least double the second switch width; and the first portion of the housing has a first portion width and the second portion of the housing has a second portion width, the first portion width is at least one and a half times greater than the second portion width.

3. The audiovisual controller as described in claim 1, wherein: the housing has a housing length as measured from the first end to the second end, the housing further comprises a central portion positioned between the first portion and the second portion, the central portion is elongated along the housing length and has a central portion width which is narrower than the first portion width.

4. The audiovisual controller as described in claim 3, wherein the central portion width is narrower than the second portion width, and forms a hand grip which allows the user to grasp the housing by holding the central portion.

5. The audiovisual controller as described in claim 1, wherein: the first keypress combination encoded within the first control signal and the second keypress combination encoded within the second control signal are formatted using keyboard scan codes specified in the wireless communication protocol, allowing the computing device to interpret the first control signal and the second control signal as keyboard keypress events.

6. The audiovisual controller as described in claim 5, wherein:
the first control signal is permanently assigned to one of the plurality of switches, and the second control signal is permanently assigned to the switch which has not been assigned to the first control signal.

7. The audiovisual controller as described in claim 1, wherein: each switch has an illumination element adapted to emit light in accordance with a plurality of illumination states, wherein the illumination element is adapted to change the illumination state when the switch is activated.

8. The audiovisual controller as described in claim 7, wherein:
the illumination states comprise a first illumination state and a second illumination state, the illumination element emits a first color when operating in the first illumination state and emits a second color when operating in the second illumination state, the illumination element alternates between the first illumination state and the second illumination state when the switch is activated.

9. A method for controlling an audiovisual application executed on a computing device, the computing device is operably linked to a video camera for capturing video and a microphone for capturing audio, the audiovisual application has an audiovisual function utilizing the video or the audio, the method comprising the steps of:
providing an audiovisual controller having a housing with a first portion, a second portion, a first switch positioned on the first portion, and a second switch positioned on the second portion, the first switch and the first portion are enlarged relative to the second switch and the second portion, the audiovisual controller further has a communication module adapted to communicate wirelessly with the computing device via a wireless communication protocol;

establishing a wireless connection between the audiovisual controller and the computing device;

locating the first switch by a user using tactile differentiation based on size disparity between the first portion and the second portion;

activating the first switch by the user, and causing the communication module to transmit to the computing device a first control signal containing a keypress combination; and receiving the first control signal by the computing device, interpreting the keypress combination by the computing device, and toggling the audiovisual function of the audiovisual application between an enabled state or a disabled state.

10. The method as recited in claim 9, wherein:
the step of activating the first switch further comprises the communication module encoding the keypress combination using keyboard scan codes each corresponding to a key in the keypress combination as specified in the wireless communication protocol; and the step of receiving the first control signal by the computing device further comprises recognizing the keypress combination as a keyboard keypress event.

11. The method as recited in claim 9, wherein:
the first switch and the second switch each have an illumination element;

the step of activating the first switch further comprises causing the illumination element of the first switch to toggle between a first illumination state and a second illumination state.

\* \* \* \* \*